(12) United States Patent
Johnson et al.

(10) Patent No.: US 12,693,724 B2
(45) Date of Patent: Jul. 28, 2026

(54) DATA STORAGE DEVICE WITH ADAPTIVE CONTROL OF CURRENT BALANCER TO REDUCE POWER CONSUMPTION

(71) Applicant: Western Digital Technologies, Inc., San Jose, CA (US)

(72) Inventors: Brian Johnson, Laguna Hills, CA (US); Peng Huang, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 103 days.

(21) Appl. No.: 18/447,501

(22) Filed: Aug. 10, 2023

(65) Prior Publication Data

US 2024/0248526 A1 Jul. 25, 2024

Related U.S. Application Data

(60) Provisional application No. 63/440,857, filed on Jan. 24, 2023.

(51) Int. Cl.
| | |
|---|---|
| *G06F 1/26* | (2006.01) |
| *G06F 1/32* | (2019.01) |
| *G06F 1/3234* | (2019.01) |
| *G06F 1/3296* | (2019.01) |

(52) U.S. Cl.
CPC .......... *G06F 1/3275* (2013.01); *G06F 1/3296* (2013.01)

(58) Field of Classification Search
CPC ........... G01C 21/3484; G01C 21/3438; H04L 9/0643; H04L 9/50; H04L 2209/84; H04L 9/3231; H04L 9/3297; H04L 9/3239
See application file for complete search history.

(56) References Cited

U.S. PATENT DOCUMENTS

| | | | |
|---|---|---|---|
| 7,154,725 | B2 | 12/2006 | Chloupek et al. |
| 9,690,346 | B1 | 6/2017 | Bucher |
| 11,340,677 | B2 | 5/2022 | Bimberg et al. |
| 11,397,623 | B2 | 7/2022 | Bimberg et al. |
| 2006/0069932 | A1 | 3/2006 | Oshikawa et al. |
| 2013/0073889 | A1 | 3/2013 | Rauschmayer et al. |
| 2016/0077542 | A1* | 3/2016 | Everson .................. G05F 3/267 |
| | | | 318/504 |
| 2017/0126164 | A1* | 5/2017 | Gibbs ........................ H02J 9/06 |
| 2022/0199142 | A1* | 6/2022 | Mathiyalagan ........ G11C 5/147 |

FOREIGN PATENT DOCUMENTS

JP 2005245194 A 9/2005

OTHER PUBLICATIONS

Schreck et al., "Power Consumption and Temperature Considerations in Disk Drives", Proceedings of 2002 ASME/STLE Joint International Tribology Conference, Oct. 27-30, 2002, p. (2): 7.

* cited by examiner

*Primary Examiner* — Xuxing Chen
(74) *Attorney, Agent, or Firm* — NOD Law PC

(57) ABSTRACT

A data storage device comprises a disk; a head configured to read data from and write data to the disk; and a current balancer configured to receive a first voltage supply having a load limit and to receive a second voltage supply. The current balancer is further configured, to reduce power consumption, to sample a first current drawn from the first voltage supply, to maintain the first current at a target level that approximately equals the load limit, and to draw a second current from the second voltage supply to satisfy a part of a total load on the first voltage supply that exceeds the load limit.

20 Claims, 12 Drawing Sheets

| | 8 | 10 | 12 | | 14 |
|---|---|---|---|---|---|
| | | | | N | Q |
| | PREAMBLE | SYNC | SERVO DATA | + | + |
| | PREAMBLE | SYNC | SERVO DATA | − | − |
| | PREAMBLE | SYNC | SERVO DATA | + | + |
| | PREAMBLE | SYNC | SERVO DATA | − | − |

80

82
SAMPLE A FIRST CURRENT DRAWN FROM A FIRST VOLTAGE SUPPLY

84
MAINTAIN THE FIRST CURRENT AT A TARGET LEVEL THAT APPROXIMATELY EQUALS A CURRENT LOAD LIMIT OF THE FIRST VOLTAGE SUPPLY

86
DRAW A SECOND CURRENT FROM A SECOND VOLTAGE SUPPLY TO SATISFY ANY PART OF A TOTAL LOAD EXCEEDING THE CURRENT LOAD LIMIT OF THE FIRST VOLTAGE SUPPLY

DATA STORAGE DEVICE WITH ADAPTIVE CONTROL OF CURRENT BALANCER TO REDUCE POWER CONSUMPTION

CLAIM OF PRIORITY UNDER 35 U.S.C. § 120

The present Application for Patent claims priority to Provisional Application No. 63/440,857 entitled "DATA STORAGE DEVICE WITH ADAPTIVE CONTROL OF CURRENT BALANCER TO REDUCE POWER CONSUMPTION" filed Jan. 24, 2023, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 is a conceptual diagram of a disk format 2 comprising multiple radially spaced and concentric servo tracks 4 defined by servo wedges $6_0$-$6_N$ recorded around the circumference of each servo track, in accordance with aspects of this disclosure. A plurality of concentric data tracks is defined relative to servo tracks 4, wherein the data tracks may have the same or a different radial density (e.g., tracks per inch (TPI)) relative to servo tracks 6. Each servo wedge 6 comprises a preamble 8 for storing a periodic pattern, which allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts) that are recorded with a predetermined phase relative to one another and relative to the servo track centerlines.

The coarse head positioning information is processed to position a head over a target data track during a seek operation, and servo bursts 14 provide fine head positioning information used for centerline tracking while accessing a data track during write/read operations. A position error signal (PES) is generated by reading servo bursts 14 and represents a measured position of the head relative to a centerline of a target servo track. The servo control system processes the PES to generate a control signal applied to the one or more actuators to actuate the head radially over the disk in a direction that reduces the PES.

The description provided in this background section should not be assumed to be prior art merely because it is mentioned in or associated with this background section.

This background section may include information that describes one or more aspects of the subject technology.

SUMMARY

The following summary relates to one or more aspects and/or embodiments disclosed herein. It should not be considered as an extensive overview relating to all contemplated aspects and/or embodiments and should not be regarded as identifying key or critical elements relating to all contemplated aspects and/or embodiments or as delineating the scope associated with any aspect and/or embodiment. Accordingly, the following summary has the sole purpose of presenting certain concepts relating to one or more aspects and/or embodiments disclosed herein in a simplified form to precede the detailed description presented below.

Multiple internal voltage levels or supplies may be used to power various components in a disk drive. A low voltage supply (in the range of 5V, for example) may be provided to power circuits and components within the disk drive with lower voltage requirements, and a high voltage supply (in the range of 12V, for example) may be provided to power components with higher voltage requirements such as the spindle motor. The low and high voltage levels may be supplied by a host power supply residing in a computing device, for example. In some instances, limits may exist on the current loads that can be placed on one or more of the internal voltage supplies. A host current limit may be set on the low voltage power supply, for example. Nevertheless, the total current load placed on the low voltage supply may exceed the host current limit. To avoid exceeding the host current limit, the amount by which the total load exceeds the host current limit must be supplied by a source other than the low voltage supply.

Various illustrative aspects are directed to a data storage device comprising a disk; a head configured to read data from and write data to the disk; and a current balancer configured to: receive a first voltage supply having a load limit, receive a second voltage supply, sample, at a plurality of times, a first current drawn from the first voltage supply, and adjust a draw of a second current from the second voltage supply to satisfy a part of a total load on the first voltage supply that exceeds the load limit.

In some implementations, the data storage device further comprises a circuit protection device that is configured to be coupled to the first and second voltage supplies. The circuit protection device comprises a current sensor configured to sense the first current drawn from the first voltage supply. In some implementations, the circuit protection device is a dual efuse.

In some implementations, the data storage device further comprises an analog-to-digital converter (ADC) that is coupled to the current sensor and that is configured to sample the first current sensed by the current sensor; and a system-on-a-chip (SoC) that is coupled to the ADC, that is configured to receive the sampled first current from the ADC, and that is configured to control the current balancer based on the sampled first current.

In some implementations, the SoC is configured to generate a current balancer threshold voltage parameter and a current balancer gain parameter for controlling the current balancer based on the sampled first current received from the ADC. The SoC may generate the current balancer threshold voltage and gain parameters by referring to a look up table, and the threshold voltage and gain parameters may be received and stored in registers coupled to the SoC.

In some implementations, the ADC is configured to periodically update the sampled first current that is provided to the SoC, and the SoC is configured to periodically update the current balancer threshold voltage and gain parameters. In some configurations, the ADC may update the sampled first current provided to the SoC at each servo ID or after a predetermined number of servo IDs.

In some implementations, where DSR $I_{pk}$ is the second current drawn by the current balancer from the second voltage supply, $I_{H5V}$ is the sampled first current as converted to a voltage, $I_{Threshold}$ is the current balancer threshold voltage parameter, Gain is the current balancer gain parameter, and minCurrentLimit$_{pk}$ is a minimum peak current amount required for turn on of the current balancer, the second current may be represented by:

$$DSR\ I_{pk} = ((I_{H5V} - I_{Threshold}) \times \text{Gain}) + minCurrentLimit_{pk}.$$

In some implementations, the first voltage supply is configured to supply a low voltage of approximately 5V and the second voltage supply is configured to supply a high voltage of approximately 12V.

Various illustrative aspects are also directed to a method for reducing power consumption by a current balancer of a data storage device configured to receive a first voltage supply having a load limit and a second voltage supply. The method comprises sampling a first current drawn from the first voltage supply; maintaining the first current at a target level that approximately equals the load limit; and drawing a second current from the second voltage supply to satisfy a part of a total load on the first voltage supply that exceeds the load limit.

In some implementations, the method further comprises sensing the first current drawn from the first voltage supply with a current sensor of a circuit protection device.

In some implementations, the method further comprises generating a current balancer threshold voltage parameter and a current balancer gain parameter for maintaining the first current at the target level based on the sampled first current.

In some implementations, the method further comprises sampling the sensed first current by an analog-to-digital converter (ADC); providing the sampled first current from the ADC to a system-on-a-chip (SOC); and generating the current balancer threshold voltage and gain parameters by the SoC.

In some implementations, the method further comprises periodically updating the sampled first current that is provided by the ADC to the SoC; and periodically updating the current balancer threshold voltage and gain parameters that are generated by the SoC. The sampled first current may be updated at each servo ID or after a predetermined number of servo IDs.

In some implementations, where DSR $I_{pk}$ is the second current drawn from the second voltage supply, $I_{H5V}$ is the sampled first current as converted to a voltage, $I_{Threshold}$ is the current balancer threshold voltage parameter, Gain is the current balancer gain parameter, and minCurrentLimit$_{pk}$ is a minimum current amount required for turn on of the current balancer, the second current may be represented by:

$$DSR\ I_{pk} = ((I_{H5V} - I_{Threshold}) \times \text{Gain}) + minCurrentLimit_{pk}.$$

Various illustrative aspects are further directed to one or more processing devices for reducing power consumption in a current balancer of a data storage device. The one or more processing devices comprise means for receiving a first voltage supply having a load limit; means for receiving a second voltage supply; means for sampling a first current drawn from the first voltage supply; means for maintaining the first current at a target level that approximately equals the load limit; and means for drawing a second current from the second voltage supply to satisfy a part of a total first voltage supply load that exceeds the load limit.

In some implementations, the one or more processing devices may further comprise means for generating a current balancer threshold voltage parameter and a current balancer gain parameter for maintaining the first current at the target level.

Various further aspects are depicted in the accompanying figures and described below and will be apparent based thereon.

BRIEF DESCRIPTION OF THE DRAWINGS

Various features and advantages of the technology of this disclosure will be apparent from the following description of examples of those technologies and from the accompanying drawings. The drawings are not necessarily to scale; emphasis instead is placed on illustrating the principles of the technological concepts. In the drawings, like reference characters may refer to the same parts throughout the different views. The drawings depict only illustrative examples of this disclosure and are not limiting in scope.

DETAILED DESCRIPTION

The word "exemplary" is used herein to mean "serving as an example, instance, or illustration." Embodiments described herein as "exemplary" should not be construed as being preferred or advantageous over other embodiments.

The embodiments described herein are not intended to limit the invention to the precise form disclosed or to be exhaustive. Rather, the embodiments are presented to provide a description so that others skilled in the art may utilize their teachings. Technology continues to develop, and aspects of the embodiments described herein may be replaced by improved and enhanced aspects. Moreover, this disclosure inherently discloses aspects of embodiments incorporating technology available at the time of this disclosure.

Figure 1:
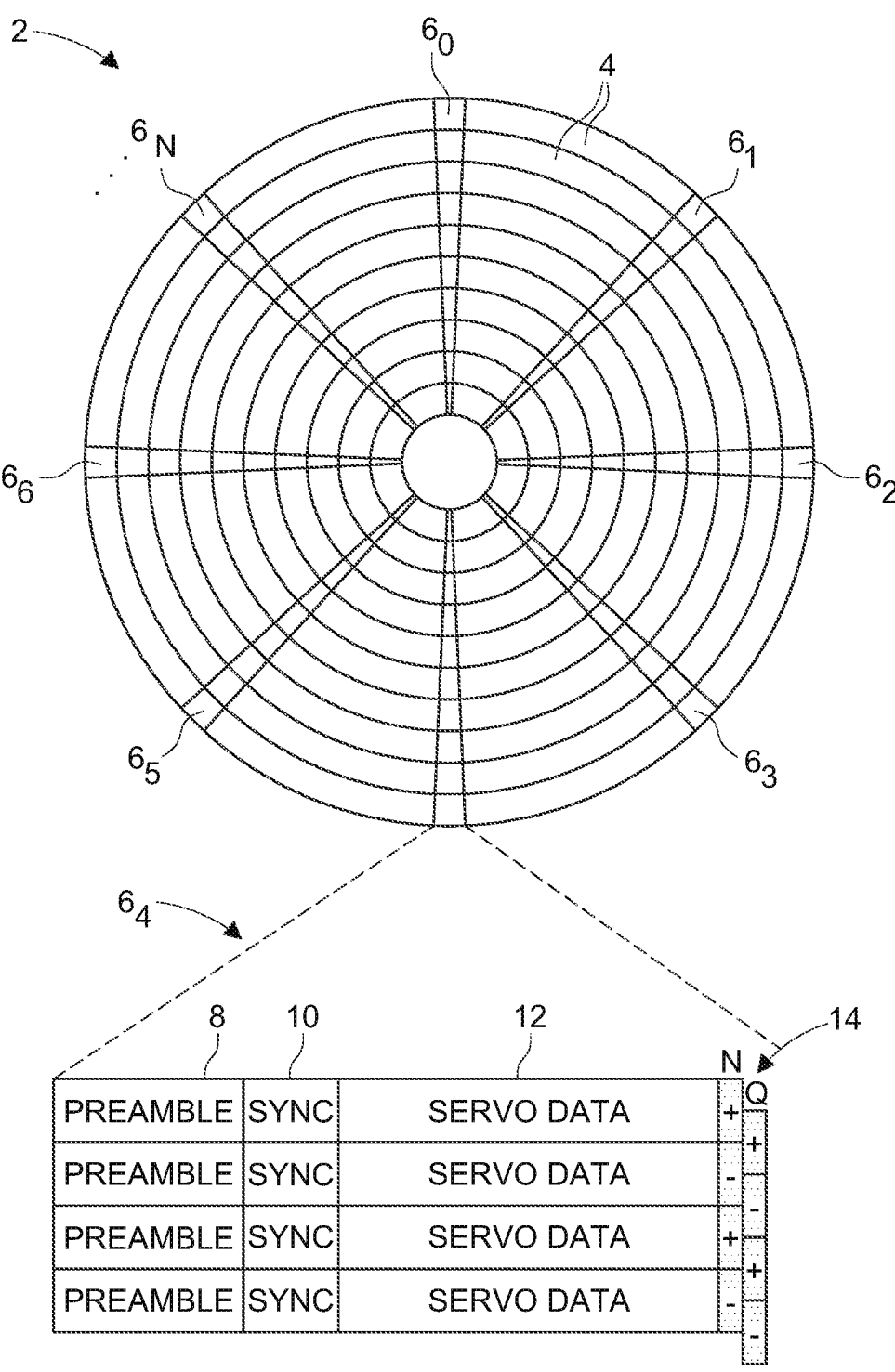
FIG. 1 is a conceptual diagram of a disk format comprising multiple radially spaced and concentric servo tracks defined by servo wedges recorded around the circumference of each servo track, in accordance with aspects of this disclosure.
Figures 2A, 2B, 2C:
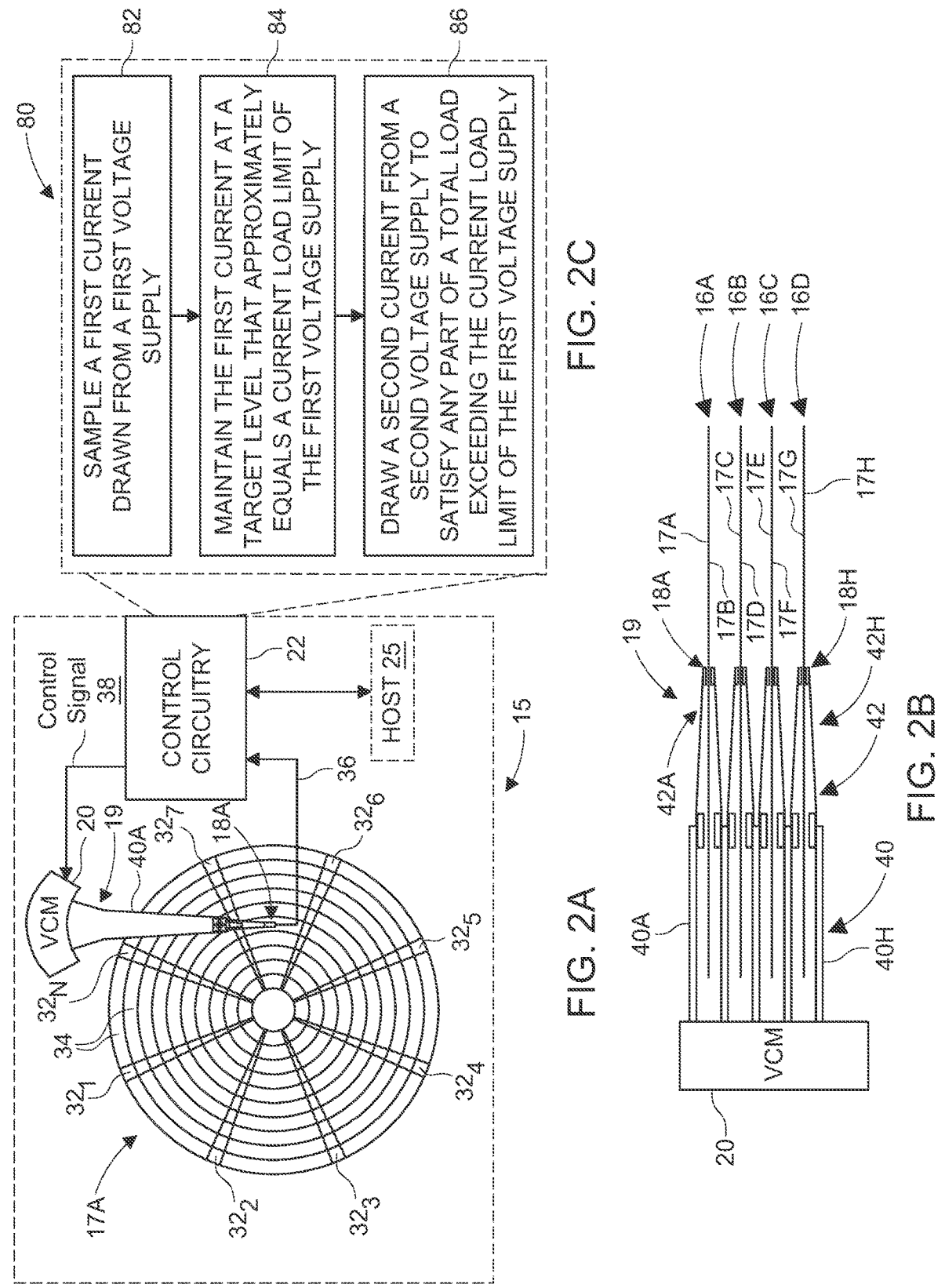
FIG. 2A is a conceptual diagram of a top view of a data storage device in the form of a disk drive, in accordance with aspects of this disclosure.
FIG. 2B is a conceptual diagram of a side view of a data storage device in the form of a disk drive, in accordance with aspects of this disclosure.
FIG. 2C is a flow diagram of a method that control circuitry of a data storage device may perform, in accordance with aspects of this disclosure.

FIGS. 2A and 2B are conceptual diagrams of top and side views of a data storage device in the form of a disk drive 15, in accordance with aspects of this disclosure. Disk drive 15 comprises control circuitry 22, actuator assembly 19, and hard disks 16 (16A . . . 16D). FIG. 2C is a flow diagram of a method 80 that control circuitry 22 of disk drive 15 may perform in accordance with aspects of this disclosure, as further described below.

Actuator assembly 19 is configured to position heads 18 (18A . . . 18H) over disk surfaces 17 (17A . . . 17H) of disks 16. Heads 18 comprise write and read elements configured to write and read control features and data to and from corresponding disk surfaces 17 of disks 16. Actuator assembly 19 comprises primary actuator (VCM) 20, actuator arms 40 (40A . . . 40E), and suspensions 42 (42A . . . 42H). Heads 18 are configured at distal ends of suspensions 42 and are suspended in close proximity over corresponding disk surfaces 17. The examples shown in FIGS. 2A and 2B are for non-limiting purposes of illustration only; any of a wide variety of other numbers of actuator assemblies, actuator arms, suspensions, heads, disks, and disk surfaces may be employed.

FIG. 2A also depicts servo sectors 32 (321 . . . 32N) written onto disk surfaces 17. When manufacturing disk drive 15, servo sectors 32 may be written to disk surfaces 17 to define evenly spaced, concentric tracks 34. Each servo sector 32 may include, for example, a phase locked loop (PLL) field, a servo identification field (SID), a servo sync mark (SSM) field, a track identification (TKID) field, a sector ID, and a group of servo bursts (e.g., an alternating pattern of magnetic transitions) that the servo system of disk drive 15 samples to align head 18 with, and relative to, a particular track 34. Servo sectors 32 are spaced sequentially around a circumferential track 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors, and each data region is typically preceded by a servo sector 32.

In disk drive 15, multiple internal voltage levels or supplies are used to power various components in the disk drive. A first voltage supply (in some examples, a relatively low voltage supply in the range of 5V) may be provided to power circuits and components within disk drive 15 having first (typically lower) voltage requirements, and a second voltage supply (in some examples, a relatively high voltage supply in the range of 12V) may be provided to power components with second (typically higher) voltage requirements such as the spindle motor. The first or low voltage supply is sometimes referred to as the 5V or "D5V" rail, and the second or high voltage supply is sometimes referred to as the 12V or "D12V" rail. The low and high voltage supplies may be provided by a host power supply residing in a host 25, for example. Host 25 may be a computing device such as a desktop computer, a laptop, a server, a mobile computing device (e.g., smartphone, tablet, Netbook, to name a few non-limiting examples), or any other suitable computing device. Alternatively, host 25 may be a test computer that performs calibration and testing functions during the disk drive manufacturing process.

In some instances, limits may exist on current loads that can be placed on one or more of the internal voltage supplies. With respect to the low voltage (5V) supply, for example, a host current limit may be set by host 25. In one non-limiting example, the host current limit of the low voltage supply may be 1.5 A. Nevertheless, the total current load placed on the low voltage supply ("total low voltage supply load") may exceed the host current limit. For example, where the host current limit for the low voltage supply is 1.5 A, the total low voltage supply load may be higher, such as 2A. In this example, the amount by which the total low voltage supply load exceeds the host current limit (0.5 A) must be supplied by a source other than the low voltage supply, since the low voltage supply cannot support a load higher than the host current limit.

In accordance with aspects of this disclosure, control circuitry 22 is configured to perform method 80 of FIG. 2C to regulate the host current drawn from the low voltage supply in a manner that reduces or minimizes power consumption. Control circuitry 22 may comprise one or more processing devices for performing method 80 such as, for example, current balancer (CB) 300 of FIG. 3 and its constituent components. In step 82, a first (host) current drawn from a first (low) voltage supply is periodically sampled. In step 84, the first (host) current is maintained at a target level that approximately equals a load limit of the first (low) voltage supply. In step 86, a second current is drawn from a second (high) voltage supply to satisfy the part of the total first voltage supply load that exceeds the load limit.

In the following description, for ease of reference to those of skill in the art, the first voltage supply may be referred to as a low voltage or 5V supply or rail, and the second voltage supply may be referred to as a high voltage or 12V supply or rail. These values and ranges are merely exemplary, however, and this disclosure is not limited to power supplies having those values or ranges. Likewise, while various current, voltage and power values, ranges, limits, and the like are discussed herein for sake of illustration, this disclosure is not limited to any such values, ranges, limits and the like.

Figure 3:
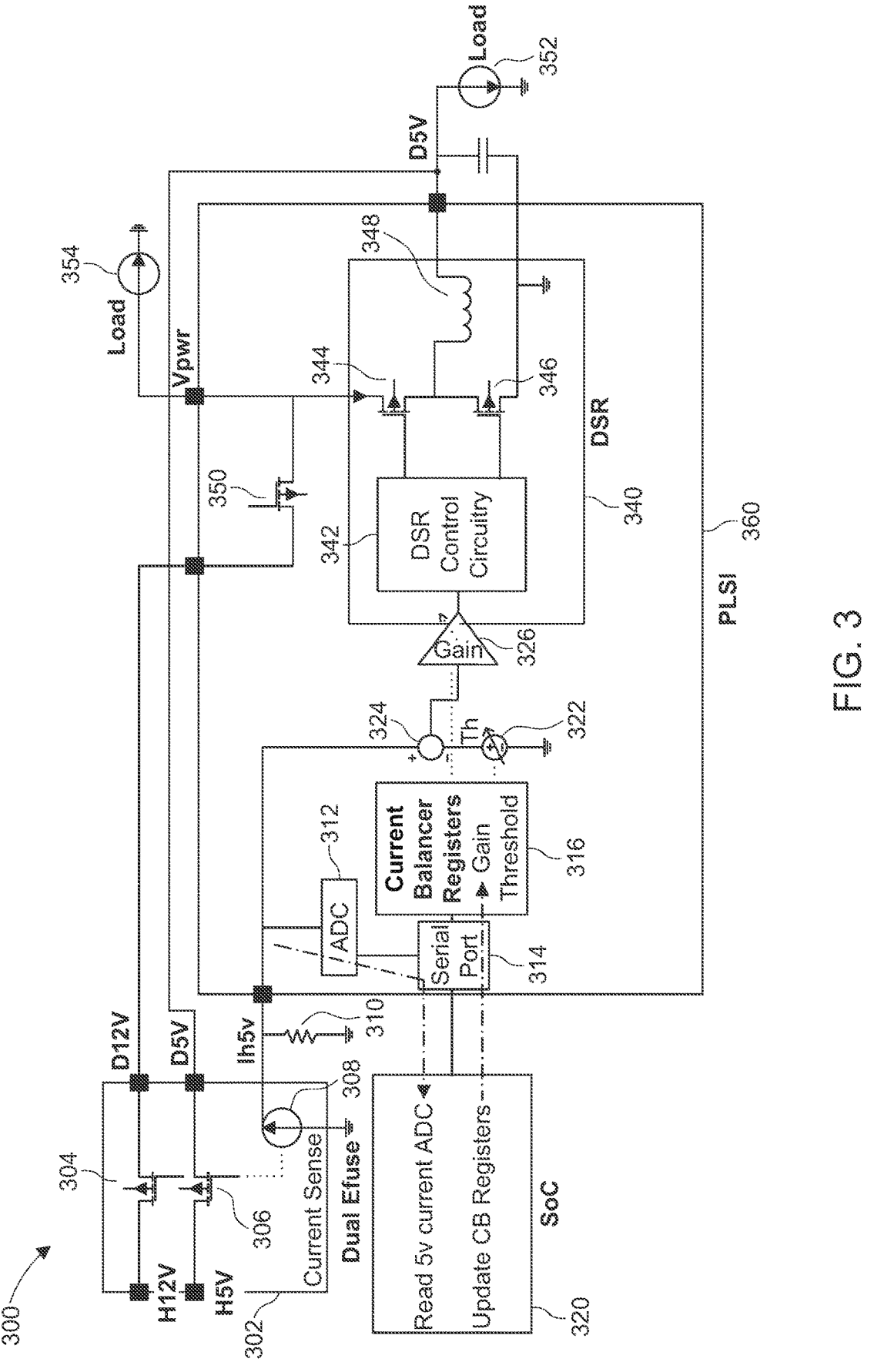
FIG. 3 is a conceptual diagram of one or more processing devices including a current balancer (CB), in accordance with aspects of this disclosure.

FIG. 3 is a conceptual block diagram of one or more processing devices including a current balancer (CB) 300, in accordance with aspects of this disclosure. Current balancer 300 is configured to regulate the host current drawn from the low voltage (5V) supply in a manner that reduces or minimizes power consumption. Current balancer 300 monitors the host current drawn from the low voltage supply that flows through circuit protection device 302. When the total low voltage supply load (e.g., load 352) exceeds the host current limit, system-on-a-chip (SoC) 320 controls drive shutdown regulator (DSR) 340 of current balancer 300 to supply the part of the total low voltage supply load that exceeds the host current limit. In one example, SoC 320 controls DSR 340 via firmware implemented on SoC 320.

DSR 340 is a regulator that, in a drive shutdown application, is operative when power is off (drive shutdown) to pull power generated from spindle back electromotive force (BEMF) via the high voltage rail to the low voltage rail. According to this disclosure, in addition to this drive shutdown application, DSR 340 is controlled to draw current from the high voltage supply to satisfy the part of the total low voltage supply load that exceeds the host current limit. Thus, current balancer 300 balances the current drawn from the low and high voltage supplies such that the current drawn from the low voltage supply does not exceed the host current limit. As described below, current balancer 300 carries out this task in a manner that reduces or minimizes power consumption by DSR 340.

In one implementation, circuit protection device 302 is a dual efuse device that protects the circuits and components within disk drive 15 from overcurrent or overvoltage conditions on loads supported by the high voltage (D12V) and low voltage (D5V) supply rails. Circuit protection device 302 automatically interrupts the flow of current when current or voltage exceeds a certain level. As can be seen in FIG. 3, circuit protection device 302 includes a first switching element 304 interposed between a high voltage input (H12V) and a high voltage output (D12V) and a second switching element 306 interposed between a low voltage input (H5V) and a low voltage output (D5V). Switching elements 304 and 306 are typically transistors such as MOSFETs (metal-oxide-semiconductor field-effect transistors) that can be switched on or off to allow or interrupt the flow of current as needed. Circuit protection device 302 also includes current sensors or monitors that sense the high and low voltage currents flowing through device 302, including current sensor or monitor 308 that senses the low voltage supply host current $I_{H5V}$ flowing through circuit protection device 302.

The peak current DSR $I_{pk}$ (second current) drawn by DSR 340 from the high voltage supply (second voltage supply) is represented by the following linear equation (1):

$$DSR\ I_{pk} = ((I_{H5V} - I_{Threshold}) \times \text{Gain}) + minCurrentLimit_{pk}.$$

In equation (1), DSR $I_{pk}$ is the peak current (second current) in amps drawn by DSR 340 from the high voltage supply (second voltage supply); $I_{H5V}$ is the low voltage supply host current (first current) flowing through circuit protection device 302 as converted to a voltage value by resistor 310 and sampled by ADC 312; $I_{Threshold}$ is a CB threshold voltage parameter (in volts) set by SoC 320; Gain is a CB gain parameter set by SoC 320; and minCurrentLimit$_{pk}$ is a minimum peak current (peak value from a triangle wave) required for turn on of DSR 340 (typically about 0.7 A). The CB threshold voltage ($I_{Threshold}$) and gain (Gain) parameters are set by SoC 320 to regulate the low voltage supply host current $I_{H5V}$ to be at or below the host current limit.

As can be seen in FIG. 3, the low voltage supply host current $I_{H5V}$ sensed by current sensor 308 is converted to a voltage value $I_{H5V}(v)$ by resistor 310, which in turn is periodically sampled by analog-to-digital converter (ADC) 312 and provided to SoC 320 via serial port 314. Based on this sampling of the host current $I_{H5V}(V)$ provided by ADC 312, SoC 320 sets the CB threshold voltage parameter $I_{Threshold}$ and the CB gain parameter Gain so as to regulate the low voltage supply host current $I_{H5V}$ to be at or below the host current limit. As described below, the host current is maintained at a target host current level that is equal to the host current limit minus a small margin. SoC 320 provides the CB threshold voltage and gain parameters via serial port 314 to CB registers 316. The CB threshold voltage parameter $I_{Threshold}$ stored in registers 316 sets the value of threshold voltage supply 322, which is then subtracted from the sampled host current $I_{H5V}$ (as converted to voltage) at 324 and multiplied by gain element 326 as set by the CB gain parameter Gain stored in registers 316. The resultant output ($I_{H5v}-I_{Threshold}$)×Gain of element 326 is input to control circuitry 342 of DSR 340.

DSR 340 includes control circuitry 342, switching elements 344 and 346 (MOSFETs, for example), and inductor 348 through which the DSR current flows (i.e., the current drawn from the high voltage supply by DSR 340). DSR control circuitry 342 controls the current flow through switching elements 344, 346 as needed to adjust the DSR current. In particular, DSR 340 draws any current above the host current limit that is needed to support the total low voltage supply load 352 from the high voltage supply D12V via switching element 350. Current balancer 300 includes output capacitor(s) 356 across which the D5V voltage is output to load 352. The high voltage supply D12V also supplies current to its own high voltage supply load 354.

As can be seen in FIG. 3, in one example, many elements of current balancer 300 are implemented on PLSI (power large scale integration) circuit 360. In particular, ADC 312, serial port 314, CB registers 316, elements 322, 324, and 326, DSR 340 and its component elements, and switching element 350 may be implemented on PLSI circuit 360.

Figure 4A:
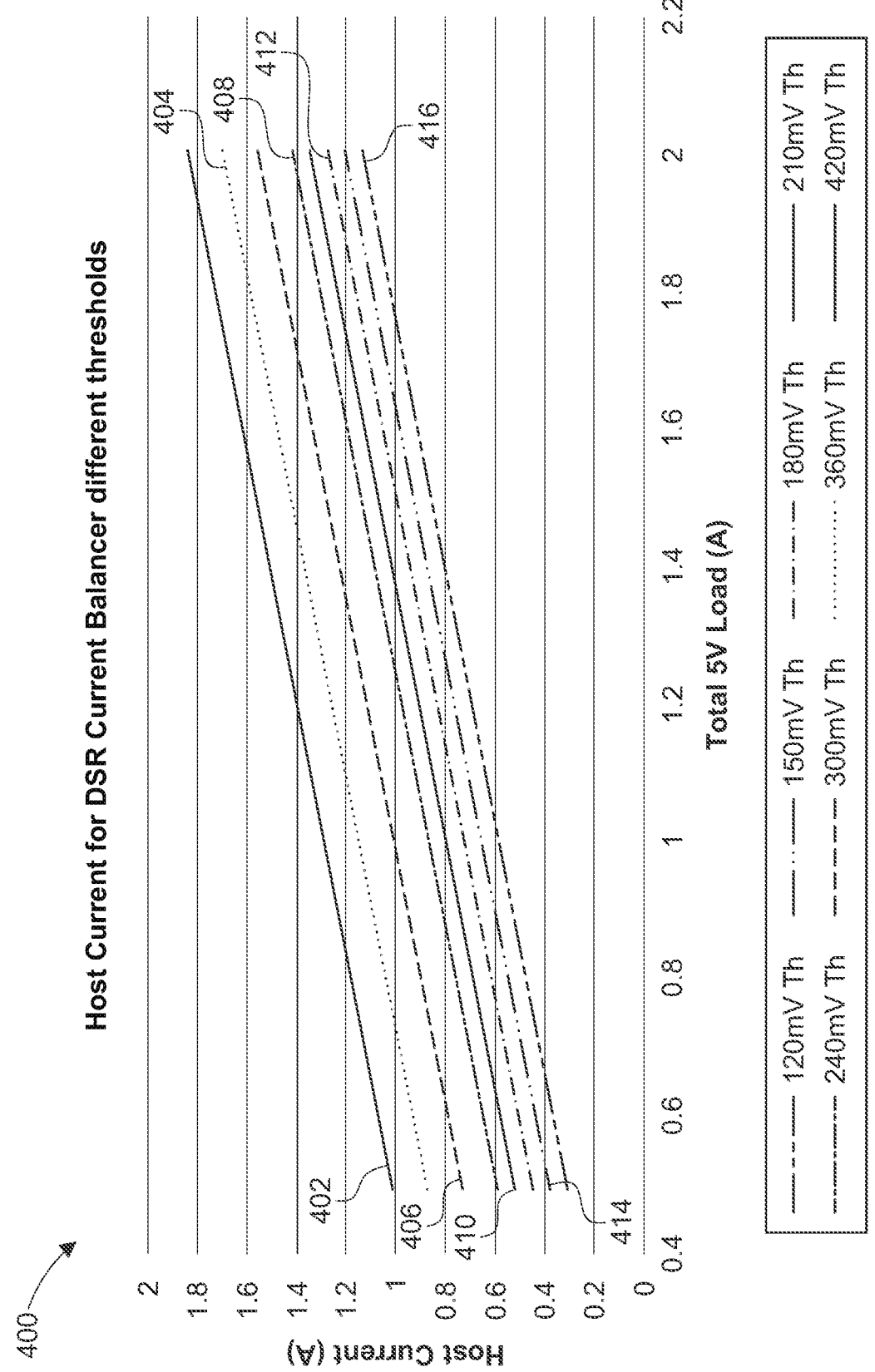
FIG. 4A is a graph plotting host current (vertical axis) versus total low voltage supply load (horizontal axis) for multiple CB threshold voltage parameter settings, in accordance with aspects of this disclosure.

FIG. 4A is a graph 400 plotting host current (vertical axis) versus total low voltage supply load (horizontal axis) for multiple CB threshold voltage parameter settings, with a maximum total low voltage supply load of 2A. In the non-limiting example of FIG. 4A, $I_{Threshold}$=420 mV for plot line 402; $I_{Threshold}$=360 mV for plot line 404; $I_{Threshold}$=300 mV for plot line 406; $I_{Threshold}$=240 mV for plot line 408; $I_{Threshold}$=210 mV for plot line 410; $I_{Threshold}$=180 mV for plot line 412; $I_{Threshold}$=150 mV for plot line 414; and $I_{Threshold}$=120 mV for plot line 416. The CB threshold voltage parameter settings depicted in FIG. 4A are for non-limiting purposes of illustration only; many other suitable threshold voltage parameter settings could alternatively be used. As can be seen in FIG. 4A, as $I_{Threshold}$ is lowered, host current $I_{H5V}$ is lowered, and as $I_{Threshold}$ is increased, host current $I_{H5V}$ is increased. Thus, the host current level can be set and changed by manipulating the CB threshold voltage parameter $I_{Threshold}$ settings.

Figure 4B:
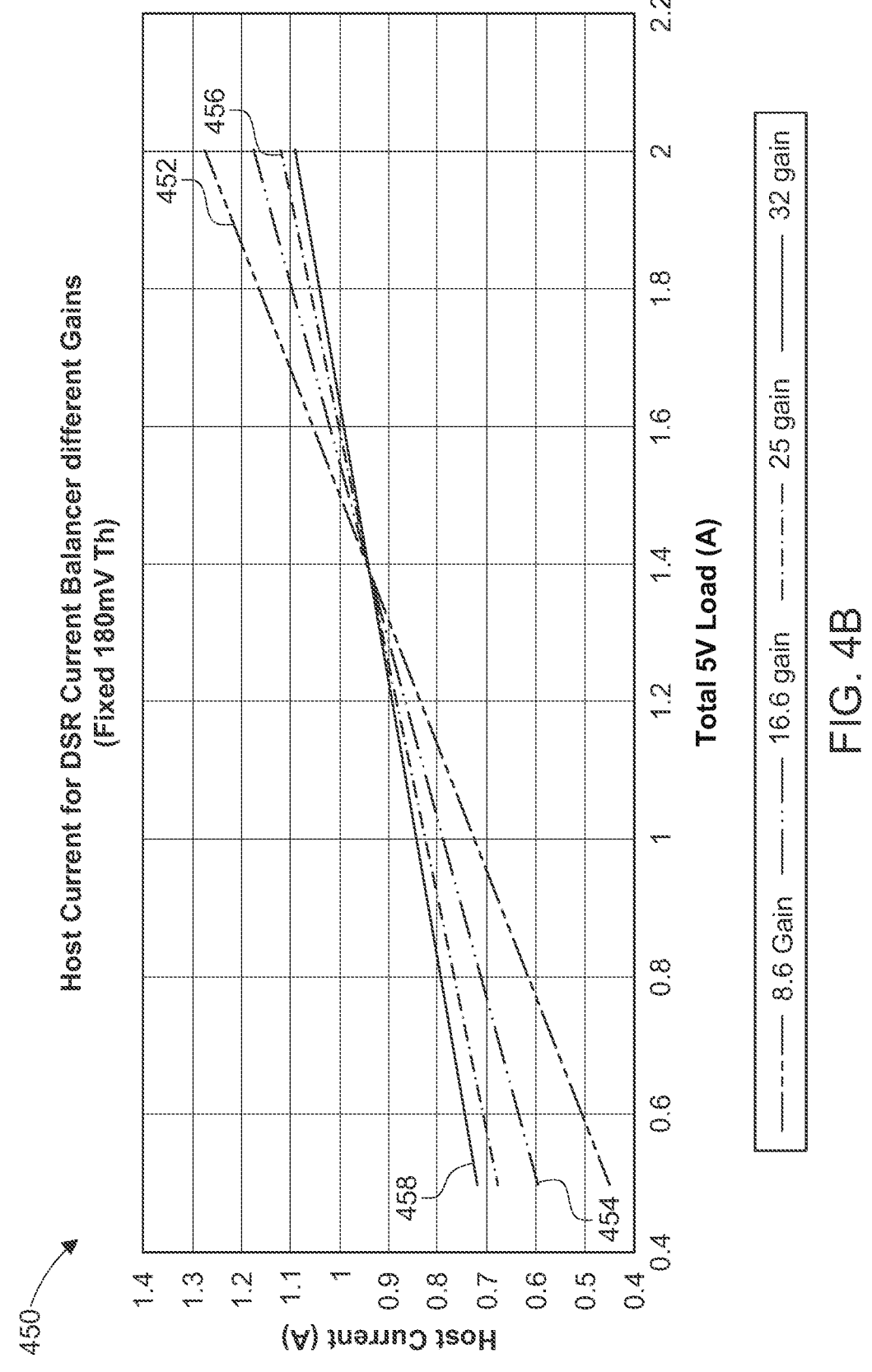
FIG. 4B is a graph plotting host current (vertical axis) versus total low voltage supply load (horizontal axis) for multiple CB gain parameter settings, in accordance with aspects of this disclosure.

FIG. 4B is a graph 450 plotting host current (vertical axis) versus total low voltage supply load (horizontal axis) for multiple CB gain parameter settings, with a maximum total low voltage supply load of 2A, and with a fixed $I_{Threshold}$=180 mV. In the non-limiting example of FIG. 4B, Gain=8.6 for plot line 452; Gain=16.6 for plot line 454; Gain=25 for plot line 456; and Gain=32 for plot line 458. The CB gain parameter settings depicted in FIG. 4B are for non-limiting purposes of illustration only; many other suitable CB gain parameter settings could alternatively be used. As can be seen in FIG. 4B, at higher Gain parameter settings, the host current increases at a lesser rate as the total load increases, and at lower Gain parameter settings, the host current increases at a greater rate as the total load increases. Thus, the host current level is also impacted by manipulating the CB gain parameter settings, in combination with manipulation of the CB threshold voltage parameter settings.

Figure 5:
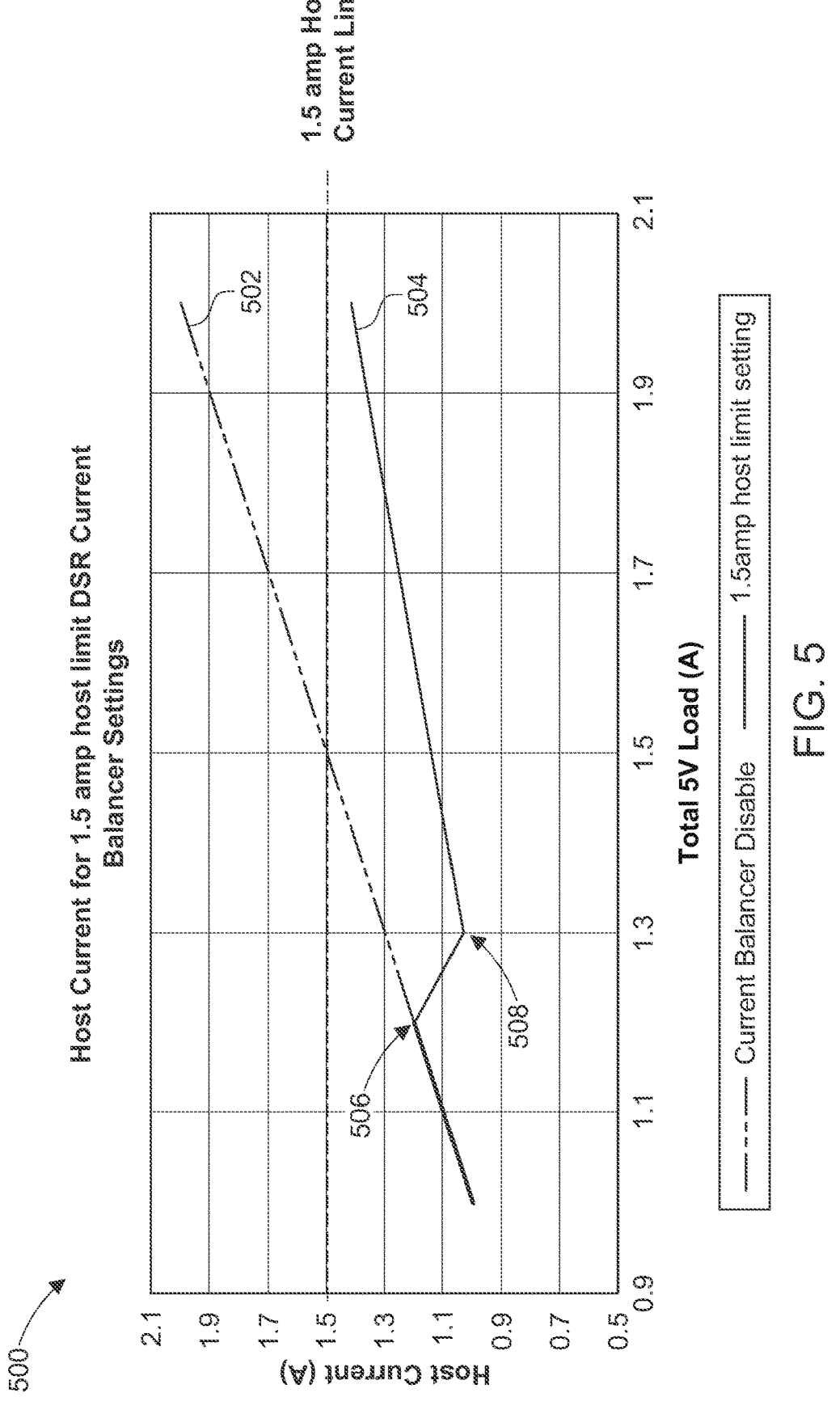
FIG. 5 is a is a graph plotting host current (vertical axis) versus total low voltage supply load (horizontal axis) for a CB disabled setting and for a CB baseline setting, in accordance with aspects of this disclosure.

FIG. 5 is a graph 500 plotting host current (vertical axis) versus total low voltage supply load (horizontal axis) when the current balancer is disabled (CB disabled setting) and for a CB baseline setting. In the non-limiting example of FIG. 5, there is a 1.5 A host current limit and a maximum total low voltage supply load of 2A. Plot line 502 depicts host current versus the total 5V load for the CB disabled setting (i.e., DSR 340 is turned off). In the CB disabled setting, DSR 340 is turned off and does not draw any current from the high voltage supply. The host current therefore supports and is equal to the total 5V load at all points along line 502. Consequently, in the CB disabled setting, once the total 5V load exceeds the host current limit, the host current also exceeds the host current limit.

Plot line 504 of FIG. 5 illustrates a CB baseline setting in which, once the host current reaches a certain level (in the example of FIG. 5, approximately 1.2 A at point 506), DSR 340 turns on with CB threshold voltage and gain parameter settings that are sufficient to maintain the host current below the 1.5 A host current limit even when the maximum total 5V load of 2A is reached. In particular, at point 506 (about 1.2 A host current), DSR current balancer 340 turns on and begins drawing current from the high voltage supply such that the host current decreases until point 508. From point 508 onwards the host current steadily increases (based on the CB threshold voltage and gain parameter settings) and approaches (but does not exceed) the host current limit when the maximum total low voltage supply load is reached.

The CB baseline setting of FIG. 5, while relatively simple and achieving the goal of not exceeding the host current limit, has a drawback in that it leads to excessive power consumption by DSR 340. Whenever DSR 340 is turned on and used, overall power efficiency is lost since the DSR regulator has only around 85% efficiency. In FIG. 5, although the goal of keeping the host current below the host current limit is achieved, DSR 340 is turned on well before it is needed, and then remains on until the host current ramps up to its maximum, leading to significant loss of power efficiency. Thus, it is advantageous in terms of power consumption to use DSR 340 only when it is needed.

In accordance with aspects of this disclosure, to maintain the host current below the host current limit while also minimizing unnecessary power consumption by the current balancer, the host current is continually monitored and the CB threshold voltage and gain parameters are adaptively adjusted on a continual basis, so that the host current is ramped up to be at or near the host current limit and then regulated to stay at or near that level. A margin may be provided so that the host current is ramped up to and then maintained at a target host current level that is slightly less than the host current limit. In this regard, a target current level that is slightly less than the host current limit by a small margin is considered to "approximately equal" to the host current limit. In one non-limiting example, if the host current limit is 1.5 A, a margin of 0.050 A may be provided so that the target host current is about 1.45 A (host current limit of 1.5 A less margin of 0.050 A) and thereby approximately equal to the host current limit. The CB threshold voltage and gain parameters are swept through so that DSR 340 draws only that current from the high voltage (12V) supply that is needed to maintain the host current at around the target host current level of 1.45 A.

Figure 6:
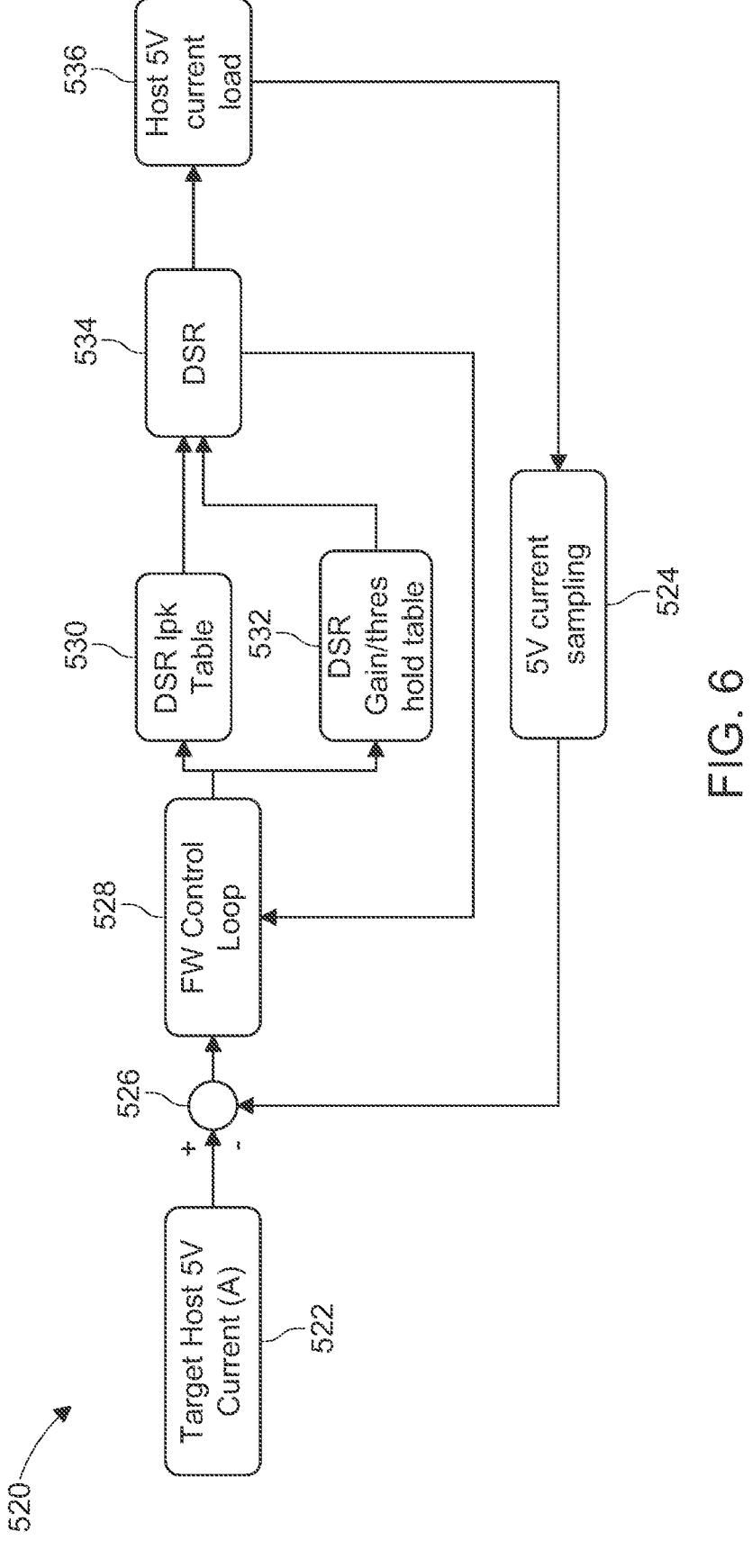
FIG. 6 is a flow diagram of a control loop for regulating host current and implementing a CB power saving method, in accordance with aspects of this disclosure.

FIG. 6 is a flow diagram of a control loop 520 for regulating the host current and implementing a CB power saving method, in accordance with aspects of this disclosure. Control loop 520 is implemented by SoC 320 to regulate the host current to stay at or near a target host current setting. The target host current setting is provided at step 522. As discussed above, the target host current setting is the host current limit minus a predetermined margin. For a host current limit of 1.5 A, for example, the predetermined margin may be 0.050 A, and the target host current may therefore set to be 1.45 A. The host current $I_{H5V}$ (as translated to a voltage by resistor 310) is sampled periodically by ADC 312 (step 524) and provided to SoC 320 via serial port 314. For example, ADC 312 may sample host current $I_{H5V}$ at each servo ID ("SID"), which is a field indicating the start of a new servo sector, or after a certain number of servo IDs (i.e., every other servo ID, every third servo ID, etc.).

The sampled host current is subtracted from the target host current setting at 526, and the difference is input to firmware (FW) control loop 528 that is implemented by SoC 320. FW control loop 528 accesses a DSR Ipk lookup table at 530, which translates the input to FW control loop 528 (difference between target host current setting and sampled host current) to CB threshold voltage and gain parameter settings (532) that are effective (by application of equation (1)) to keep the host current at or near the target host current setting. The updated threshold voltage and gain parameter settings are written to CB registers 316 on PLSI circuit 360 and provided to control circuitry 342 of DSR 340 in step 534. DSR 340 draws any additional current (DSR $I_{pk}$ current) needed to support the total low voltage supply load from the high voltage supply and applies that current to the low voltage supply load in step 536. Control loop 520 repeats this sampling and updating process so that the host current is continually maintained at or about the desired target host current level.

Figure 7:
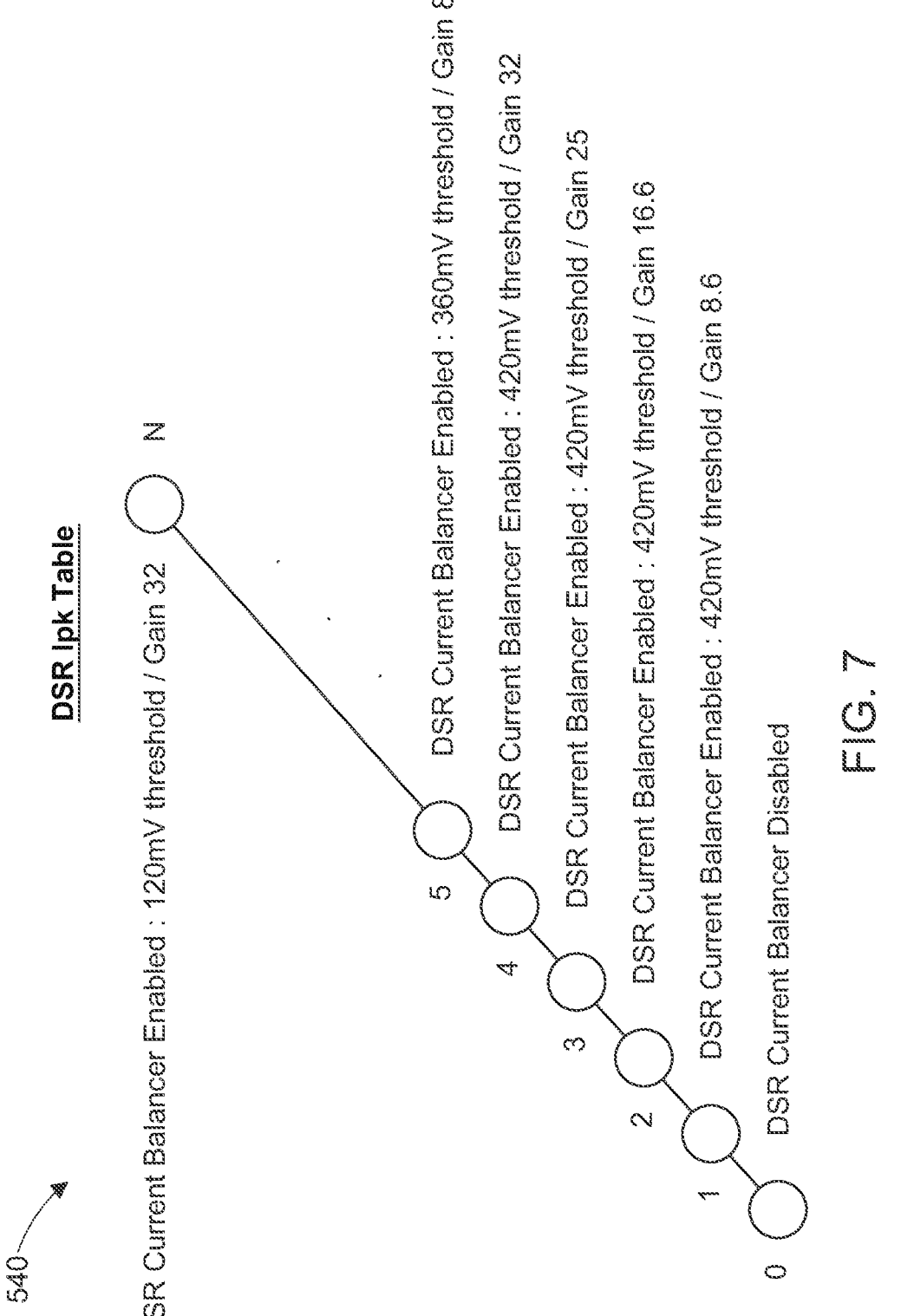
FIG. 7 is a conceptual diagram of a drive shutdown regulator (DSR) peak current ($I_{pk}$) lookup table, in accordance with aspects of this disclosure.

FIG. 7 is a conceptual diagram of a DSR peak current ($I_{pk}$) lookup table 540 that may be utilized by FW control loop 520, in accordance with aspects of this disclosure. Look up table 540 includes 0 . . . N states, where each of the 0 . . . N states corresponds, based on the sampled host current and target host current setting, to CB threshold and gain parameter settings that are effective to keep the host current at or near the target host current setting. DSR 340 is disabled (in off state "0") until the sampled host current reaches a value (i.e., the target host current setting) at which additional DSR current is needed from the high voltage supply to support the total low voltage supply load. Once enabled, FW control loop 528 progressively sweeps through higher CB threshold voltage parameter settings to lower CB threshold voltage parameter settings, such that at higher CB threshold voltage parameter settings (i.e., soon after DSR 340 is enabled), the host current represents a higher percentage of the total low voltage supply load, and at lower CB threshold voltage parameter settings, an increasing amount of current is drawn from the high voltage supply to support a part of the total low voltage supply load that exceeds the host current limit. For each CB threshold voltage parameter, FW control loop 528 progressively sweeps through the CB gain parameter settings, from lower gain to higher gain.

Figure 8:
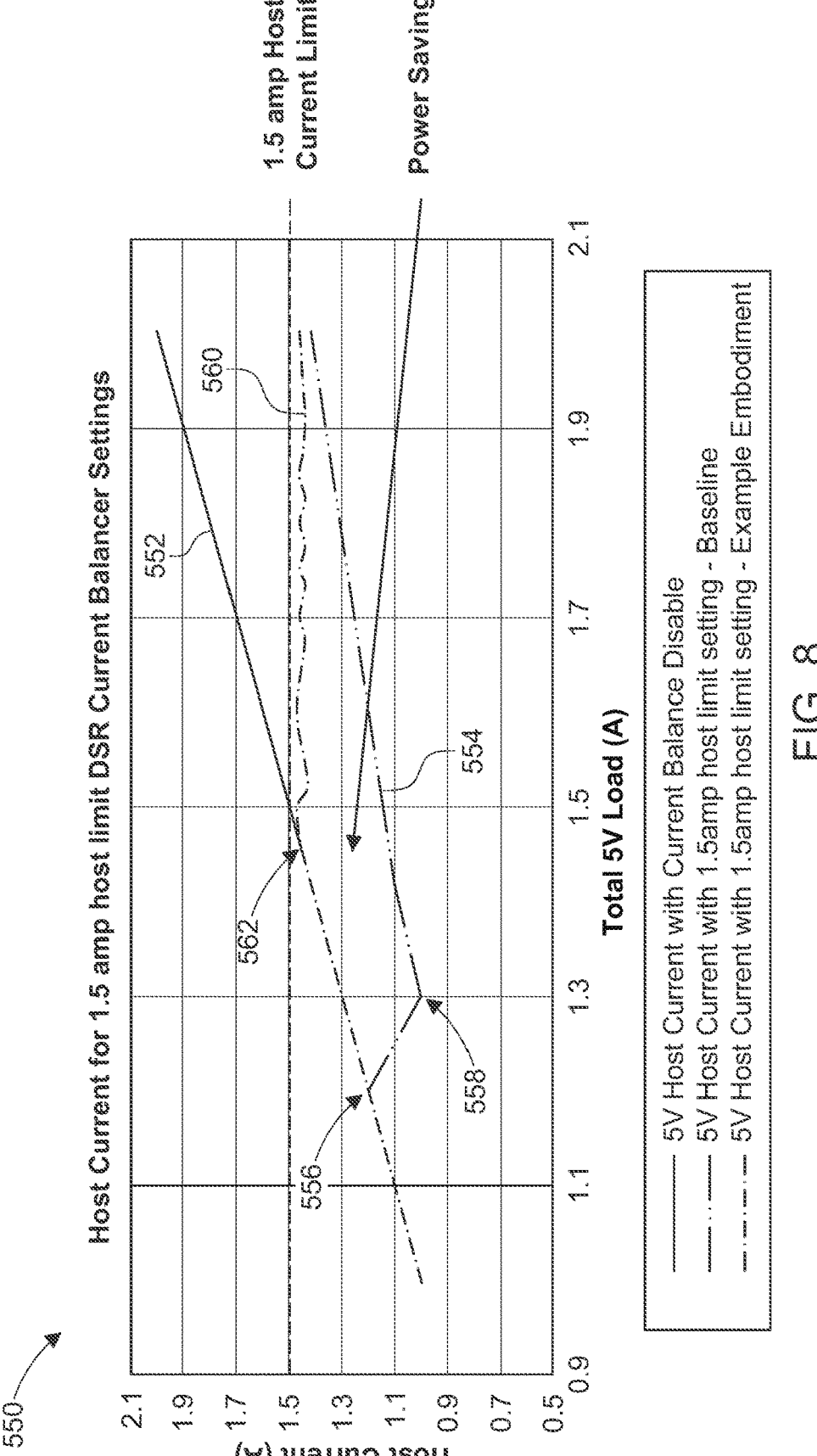
FIG. 8 is a is a graph plotting host current (vertical axis) versus total low voltage supply load (horizontal axis) for the CB disabled setting, for the CB baseline setting, and for a CB power saving method, in accordance with aspects of this disclosure.

As a result of the continual sampling of host current level and adaptive adjustment of the CB threshold voltage and gain parameter settings, as implemented by FW control loop 520, DSR 340 is turned on only as needed to keep the host current just under the host current limit (i.e., at about target host current level). This is illustrated in FIG. 8, which is a graph 550 plotting host current (vertical axis) versus total low voltage supply load (horizontal axis) for the CB disabled setting, for the CB baseline setting, and for the CB power saving method implementing control loop 520, in accordance with aspects of this disclosure. Plot line 552 represents the CB disabled setting (as in FIG. 5), and plot line 554 represents the CB baseline setting in which at point 556 (about 1.2 A host current), DSR current balancer 340 turns on and host current decreases until point 558, and from point 558 onwards the host current steadily increases (based on the baseline threshold voltage and gain settings) and approaches (but does not exceed) the host current limit when the peak total load (approximately 2 A in this example) is reached.

Plot line 560 of FIG. 8 represents the CB power saving method in which control loop 520 of FIG. 6 is implemented. As can be seen in FIG. 8, the host current increases steadily and is equal to the total load until point 562 is reached at the target host current level (i.e., about 1.45 A), which as previously described is a predetermined margin (i.e., about 0.05 A) below the host current limit (i.e., about 1.5 A). From this point on, because of the continual sampling of the host current and updating of CB threshold voltage and gain parameters, and the steady increase of DSR current drawn from the high voltage supply, the host current remains relatively constant and just below the host current limit. DSR 340 is enabled substantially later in the CB power saving method (line 560) than in the CB baseline setting (line 554), creating a substantial power savings since operation of DSR 340 is minimized as compared to operation in the CB baseline setting.

Figure 9A:
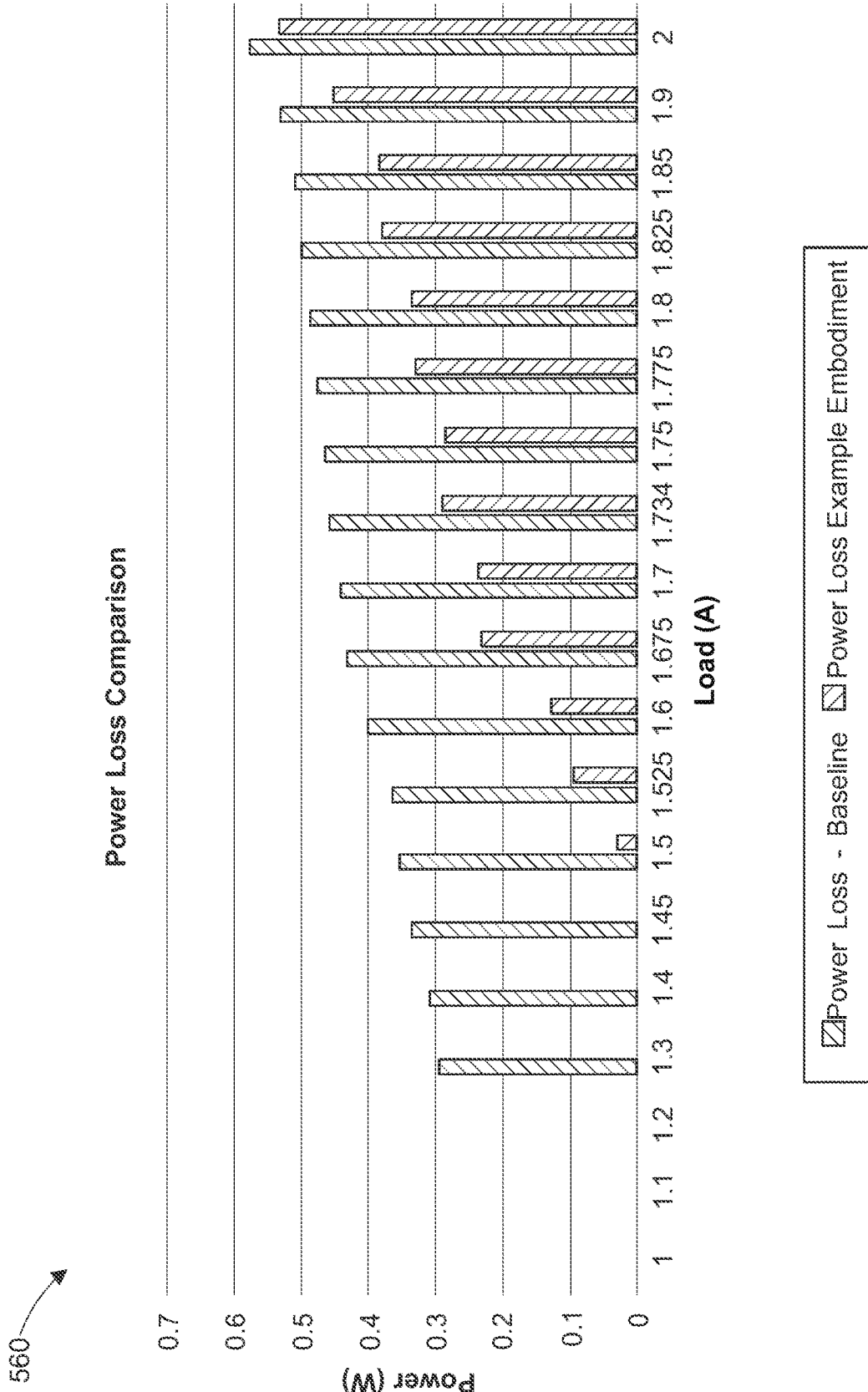
FIG. 9A is a graph plotting power loss (vertical axis) versus total low voltage supply load (horizontal axis) for the CB baseline setting and for the CB power saving method, in accordance with aspects of this disclosure.

FIG. 9A is a graph 565 plotting power loss (vertical axis) versus total low voltage supply load (horizontal axis) for the CB baseline setting and for the CB power saving method of control loop 520, in accordance with aspects of this disclosure. At lower total supply loads, where DSR 340 is enabled in the CB baseline setting but is not yet enabled in the CB power saving method of control loop 520, there is substantial reduction in power loss in the CB power saving method relative to the CB baseline setting. At a total supply load level of 1.45 A, for example, there is a reduction in power loss of approximately 325 mW using the CB power saving method of control loop 520. As total low voltage supply load increases, requiring increased use of DSR 340 even in the CB power saving setting, the power loss difference between the two settings gradually decreases, and is approximately equal at the maximum load of 2A.

Figure 9B:
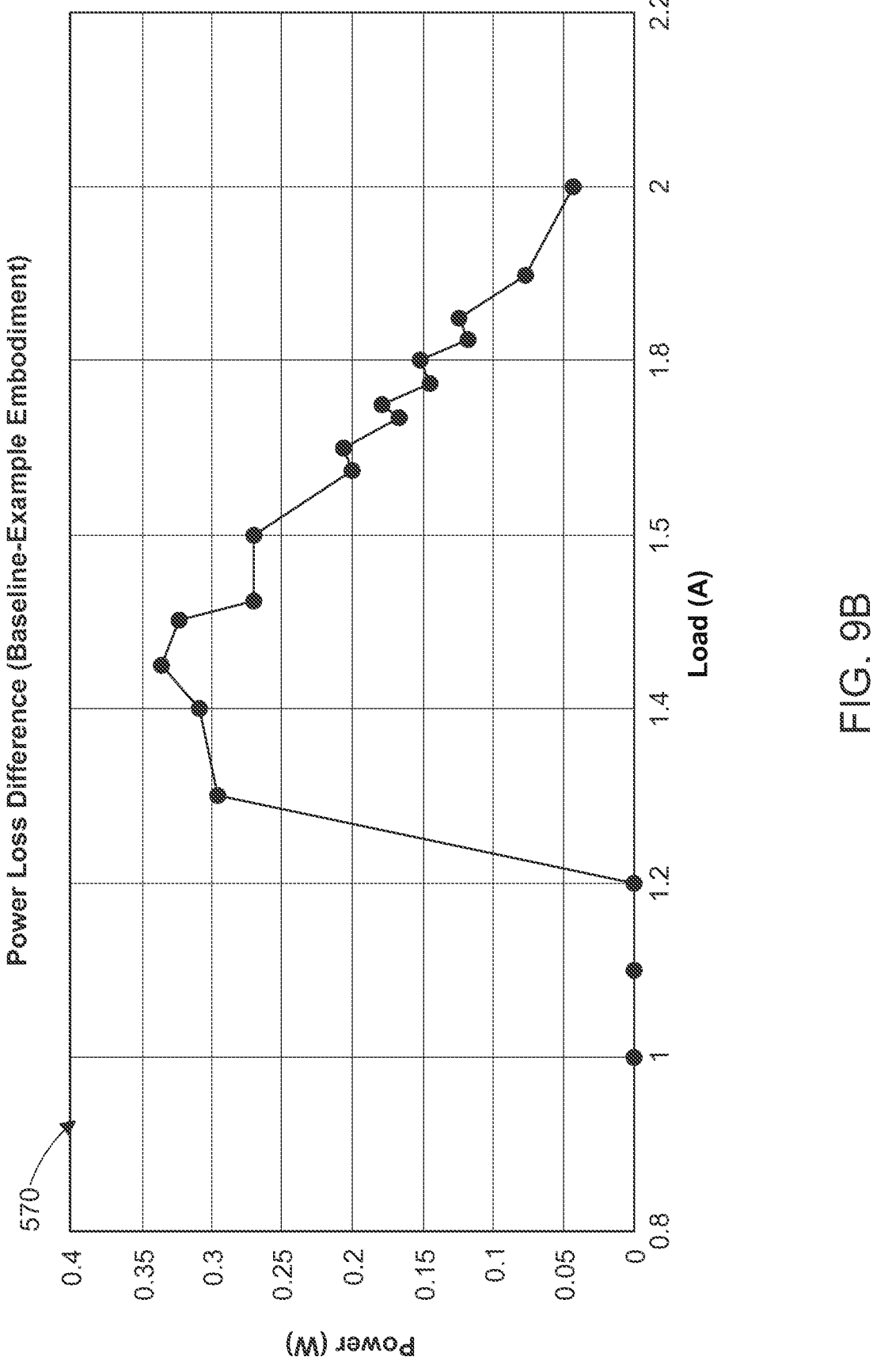
FIG. 9B is a graph plotting the power loss difference between the CB baseline setting and the CB power saving method (vertical axis) versus total low supply voltage load (horizontal axis), in accordance with aspects of this disclosure.

FIG. 9B is a graph 570 plotting power loss difference between the CB baseline setting and the CB power saving method (vertical axis) versus total low supply voltage load (horizontal axis), in accordance with aspects of this disclosure. As similarly shown in FIG. 9A, substantial reduction in power loss is achieved by using the CB power saving method as implemented by FW control loop 520, especially at lower total 5V load levels where DSR 340 is enabled in the CB baseline setting but is not yet enabled in the CB power saving setting.

Figure 10:
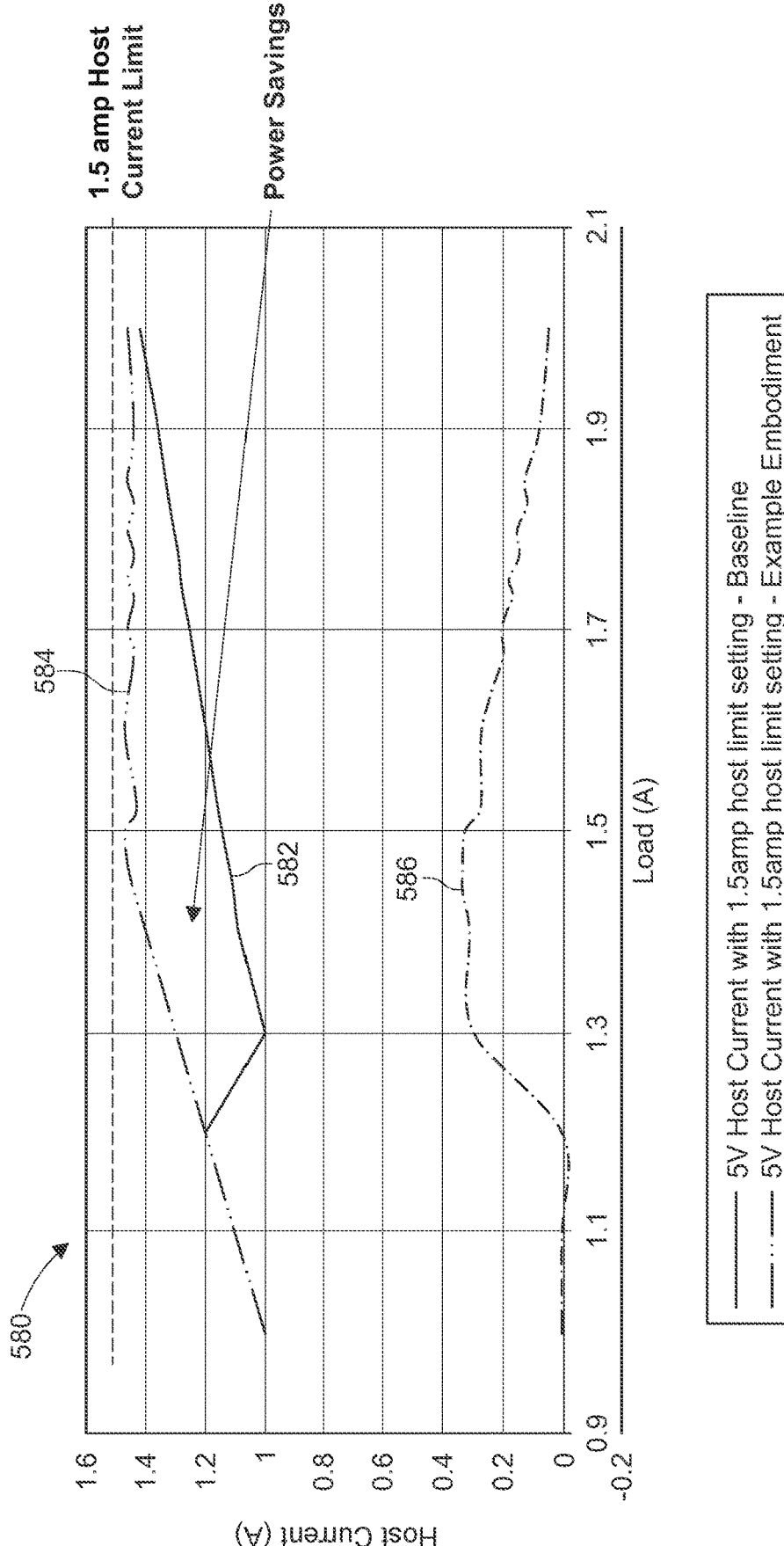
FIG. 10 is a graph plotting host current (vertical axis) versus total low voltage supply load (horizontal axis) for the CB baseline setting and for the CB power saving method, in accordance with aspects of this disclosure.

FIG. 10 is a graph 580 plotting host current (vertical axis) versus total low voltage supply load (horizontal axis) for the CB baseline setting and for the CB power saving method, along with the power savings achieved by utilizing control loop 520 implementing the CB power saving method, in accordance with aspects of this disclosure. Plot line 582 represents the CB baseline setting as previously described, and plot line 584 represents the CB power saving method as provided by control loop 520 according to an example embodiment. Plot line 586 graphically illustrates the power savings that are achieved relative to the CB baseline setting by implementing control loop 520, especially at lower total 5V load levels where DSR 340 is enabled in the CB baseline setting but is not enabled in the CB power saving method.

Any suitable control circuitry may be employed to implement the flow diagrams in the above examples. The term "control circuitry" should be understood to include, without limitation, any or all of control circuitry 22, current balancer 300, SoC 320, DSR 340 and PLSI circuit 360. For example, the control circuitry may be implemented in a suitable integrated circuit(s), in a read channel integrated circuit, or in a component separate from the read channel, such as a data storage controller. Some operations described above may be performed by a read channel and others by a data storage controller. The control circuitry may be wholly or partly implemented in various portions of an RF signal source architecture.

In some examples, the control circuitry may comprise a microprocessor executing instructions operable to perform the flow diagrams described herein (e.g., FIGS. 2C and 6). The instructions may be stored in any computer-readable medium. In some examples, the instructions may be stored on a non-volatile semiconductor memory device, component, or system external to the microprocessor, or integrated with the microprocessor in an SoC. In some examples, the instructions are stored on a disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the flow diagram blocks may be implemented using digital circuitry or a combination of analog and digital circuitry.

In various examples, one or more processing devices may comprise the control circuitry described herein, and/or may perform one or more of the functions of the control circuitry described herein. The control circuitry, or other processing devices performing one or more of the functions of the control circuitry described herein, may be abstracted away from being physically proximate to the disks and disk surfaces. The control circuitry, or other processing devices performing functions of the control circuitry described herein, may be part of or proximate to a rack of products or a unitary product comprising multiple data storage devices, or may be part of or proximate to one or more physical or virtual servers, or may be part of or proximate to one or more local area or storage area networks, or may be part of or proximate to a data center, or may be hosted in one or more cloud services.

In various examples, disk drive 15 may be a magnetic disk drive, an optical disk drive, a hybrid disk drive, or another type of disk drive. In addition, electronic devices such as computing devices, data server devices, media content storage devices, or other devices or systems may comprise the storage media and/or control circuitry described above.

The various features and processes described above may be used independently or may be combined in various ways. All possible combinations and sub-combinations fall within the scope of this disclosure. In addition, certain method or process blocks may be omitted or added in some implementations. The methods and processes described herein are not limited to any particular sequence and may be performed in sequences other than those described. Multiple tasks or events may be combined in a single block or state and may be performed in serial, in parallel, or in another manner.

While certain embodiments are described herein, these embodiments are presented by way of example only, and do not limit the scope of this disclosure. Nothing in this description implies that any particular feature, characteristic, step, module, or block is necessary or indispensable. Various omissions, substitutions, and changes in the form of the methods and systems described herein may be made without departing from the spirit and scope of this disclosure.

Some or all of any of method 80 and/or control loop 520 may be performed by or embodied in hardware, and/or performed or executed by a controller, a CPU, a field-programmable gate array (FPGA), an SoC, a multi-processor system on chip (MPSoC), which may include both a CPU and an FPGA, and other elements together in one integrated SoC, or by any other processing or computing device processing executable instructions.

Data storage systems, devices, and methods are thus shown and described herein, in various foundational aspects and in various selected illustrative applications, architectures, and techniques. Persons skilled in the relevant fields of art will be well-equipped by this disclosure and by the claims set forth below with an understanding and an informed reduction to practice of a wide array of further applications, architectures, techniques, and methods.

What is claimed is:

1. A data storage device comprising:
a disk;
a head configured to read data from and write data to the disk; and
a current balancer configured to:
    receive a first current from a first voltage supply having a load limit,
    receive a second current from a second voltage supply,
    sample, at a plurality of times, the first current drawn from the first voltage supply,
    based on the sampled first current, adjust a draw of the second current from the second voltage supply to satisfy a part of a total load on the first voltage supply that exceeds the load limit while the first current is regulated to be at a target level approximately equal to the load limit, and
    generate a current balancer threshold voltage parameter and a current balancer gain parameter for regulating the first current at the target level based on the sampled first current.

2. The data storage device of claim 1, wherein the current balancer comprises:
an analog-to-digital converter (ADC) configured to sample the first current sensed by a current sensor; and
a system-on-a-chip (SoC) configured to receive the sampled first current from the ADC, and control the current balancer based on the sampled first current at each of the plurality of times.

3. The data storage device of claim 2, wherein the SoC is further configured to generate the current balancer threshold voltage parameter and the current balancer gain parameter for controlling the current balancer based on the sampled first current received from the ADC.

4. The data storage device of claim 3, wherein the SoC is further configured to generate the current balancer threshold voltage parameter and the current balancer gain parameter by referring to a data structure.

5. The data storage device of claim 3, wherein the current balancer further comprises registers that are coupled to the SoC and that are configured to receive and store the current balancer threshold voltage parameter and the current balancer gain parameter from the SoC.

6. The data storage device of claim 3, wherein the ADC is further configured to periodically update the sampled first current that is provided to the SoC, and wherein the SoC is further configured to periodically update the current balancer threshold voltage parameter and the current balancer gain parameter.

7. The data storage device of claim 3, wherein the ADC is further configured to update the sampled first current provided to the SoC at each servo identification (ID) or at an interval of predetermined number of a plurality of servo IDs.

8. The data storage device of claim 3, wherein:
DSR $I_{pk}$ is the second current drawn by the current balancer from the second voltage supply;
$I_{H5V}$ is the sampled first current as converted to a voltage;
$I_{Threshold}$ is the current balancer threshold voltage parameter;
Gain is the current balancer gain parameter;
minCurrentLimit$_{pk}$ is a minimum current amount required for turn on of the current balancer; and
the second current is represented by:

$$DSR\ I_{pk} = ((I_{H5V} - I_{Threshold}) \times \text{Gain}) + minCurrentLimit_{pk}.$$

9. The data storage device of claim 1, wherein the first voltage supply is configured to supply a low voltage of approximately 5V, and the second voltage supply is configured to supply a high voltage of approximately 12V.

10. The data storage device of claim 2, further comprising a circuit protection device that is configured to be coupled to the first and second voltage supplies, the circuit protection device comprising the current sensor.

11. The data storage device of claim 10, wherein the circuit protection device is a dual electrical fuse (efuse).

12. A method for reducing power consumption by a current balancer of a data storage device, the current balancer configured to receive a first current from a first voltage supply having a load limit and a second current from a second voltage supply, the method comprising:
    sampling, at a plurality of times, the first current drawn from the first voltage supply;
    adjusting, based on the sampled first current, a draw of the second current from the second voltage supply to satisfy a part of a total load on the first voltage supply that exceeds the load limit while regulating the first current to be at a target level approximately equal to the load limit; and
    generating a current balancer threshold voltage parameter and a current balancer gain parameter for maintaining the first current at the target level based on the sampled first current.

13. The method of claim 12, wherein sampling the first current is performed by an analog-to-digital converter (ADC), the method further comprising:

providing the sampled first current from the ADC to a system-on-a-chip (SoC).

14. The method of claim 13, wherein generating the current balancer threshold voltage parameter and the current balancer gain parameter is performed by the SoC based on the sampled first current at each of the plurality of times.

15. The method of claim 14, further comprising:
periodically updating the sampled first current that is provided by the ADC to the SoC; and
periodically updating the current balancer threshold voltage parameter and the current balancer gain parameter that are generated by the SoC.

16. The method of claim 15, further comprising:
updating the sampled first current at each servo identification (ID) or at an interval of predetermined number of a plurality of servo IDs.

17. The method of claim 15, wherein:
DSR $I_{pk}$ is the second current drawn from the second voltage supply;
$I_{H5V}$ is the sampled first current as converted to a voltage;
$I_{Threshold}$ is the current balancer threshold voltage parameter;
Gain is the current balancer gain parameter;
minCurrentLimit$_{pk}$ is a minimum current amount required for turn on of the current balancer; and
the second current is represented by:

$$DSR\ I_{pk} = ((I_{H5V} - I_{Threshold}) \times \text{Gain}) + minCurrentLimit_{pk}.$$

18. The method of claim 12, further comprising:
sensing the first current drawn from the first voltage supply with a current sensor of a circuit protection device.

19. One or more processing devices for reducing power consumption in a data storage device, the one or more processing devices comprising, individually or in combination:
a current balancer;
means for receiving a first current from a first voltage supply having a load limit;
means for receiving a second current from a second voltage supply;
means for sampling the first current drawn from the first voltage supply;
means for adjusting a draw of the second current from the second voltage supply to satisfy a part of a total first voltage supply load that exceeds the load limit while regulating the first current to be at a target level approximately equal to the load limit; and
means for generating a current balancer threshold voltage parameter and a current balancer gain parameter for maintaining the first current at the target level.

20. The one or more processing devices of claim 19, wherein the current balancer comprises:
an analog-to-digital converter (ADC) configured to sample the first current sensed by a current sensor; and
a system-on-a-chip (SoC) configured to receive the sampled first current from the ADC, and control the current balancer based on the sampled first current at a plurality of times.

\* \* \* \* \*